(12) United States Patent
Fricke et al.

(10) Patent No.: US 8,619,012 B2
(45) Date of Patent: Dec. 31, 2013

(54) DISPLAY ELEMENT HAVING GROUPS OF INDIVIDUALLY TURNED-ON STEPS

(75) Inventors: Peter Fricke, Corvallis, OR (US); Alan R Arthur, Salem, OR (US); Joseph Stellbrink, Corvallis, OR (US); Tim R Koch, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1127 days.

(21) Appl. No.: 12/374,977

(22) PCT Filed: Jul. 19, 2007

(86) PCT No.: PCT/US2007/073899
§ 371 (c)(1),
(2), (4) Date: Sep. 30, 2009

(87) PCT Pub. No.: WO2008/014177
PCT Pub. Date: Jan. 31, 2008

(65) Prior Publication Data
US 2010/0045582 A1   Feb. 25, 2010

(51) Int. Cl.
*G09G 3/36* (2006.01)
(52) U.S. Cl.
USPC ............... 345/97; 345/88; 345/87; 349/85
(58) Field of Classification Search
USPC ........................................ 345/87–89, 107
See application file for complete search history.

(56) References Cited

U.S. PATENT DOCUMENTS

| | | | |
|---|---|---|---|
| 4,712,877 A * | 12/1987 | Okada et al. | 349/85 |
| 4,796,980 A | 1/1989 | Kaneko | |
| 4,824,218 A | 4/1989 | Kuno | |
| 5,136,408 A | 8/1992 | Okada | |
| 5,157,524 A * | 10/1992 | Dijon et al. | 349/144 |
| 5,552,911 A * | 9/1996 | Okada et al. | 349/106 |
| 5,638,195 A | 6/1997 | Katakura | |
| 5,719,651 A * | 2/1998 | Okada et al. | 349/85 |
| 5,747,671 A | 5/1998 | Hirota | |
| 5,760,843 A | 6/1998 | Morimura | |

(Continued)

FOREIGN PATENT DOCUMENTS

| EP | 0671650 | 9/1995 |
|---|---|---|
| JP | 06253904 | 8/1994 |

(Continued)

OTHER PUBLICATIONS

EPO, First Office Action dated Sep. 7, 2012, EP App No. 07813117.4, filed Jul. 19, 2007.

*Primary Examiner* — Dorothy Harris

(57) ABSTRACT

A display element (100) corresponds to a pixel of a display. The display element includes a top electrode (102) connected to a first addressable line of the display, and a bottom electrode (104) connected to a second addressable line of the display. The display element includes a display mechanism (106) situated between the top electrode and the bottom electrode and having a number of individually turned-on steps. Each individually turned-on step has a turn-on voltage threshold at which the step is turned on upon a voltage applied between the top and the bottom electrodes equal to or greater than the turn-on voltage threshold. Each individually turned-on step has a turn-off voltage threshold at which the step is turned off upon a voltage applied between the top and the bottom electrodes equal to or less than the turn-off voltage threshold.

16 Claims, 5 Drawing Sheets

(56) References Cited

U.S. PATENT DOCUMENTS

| | | | |
|---|---|---|---|
| 5,872,611 A * | 2/1999 | Hirata et al. | 349/147 |
| 5,897,187 A * | 4/1999 | Aoki et al. | 349/144 |
| 5,899,550 A * | 5/1999 | Masaki | 349/109 |
| 6,072,555 A | 6/2000 | Mizutome | |
| 6,094,178 A | 7/2000 | Sanford | |
| 6,094,184 A | 7/2000 | Okamoto | |
| 6,094,187 A * | 7/2000 | Jones et al. | 345/690 |
| 6,108,061 A | 8/2000 | Sako | |
| 6,271,820 B1 * | 8/2001 | Bock et al. | 345/97 |
| 6,411,306 B1 | 6/2002 | Miller | |
| 6,529,212 B2 | 3/2003 | Miller | |
| 6,624,828 B1 | 9/2003 | Dresevic | |
| 6,714,212 B1 | 3/2004 | Tsuboyama et al. | |
| 6,744,483 B2 * | 6/2004 | Shigeta | 349/143 |
| 6,801,213 B2 | 10/2004 | Bergstrom | |
| 6,831,662 B1 | 12/2004 | Lum | |
| 2003/0063054 A1 | 4/2003 | Inukai | |
| 2003/0080926 A1 | 5/2003 | Morimoto | |
| 2005/0057484 A1 | 3/2005 | Diefenbaugh | |
| 2005/0068332 A1 | 3/2005 | Diefenbaugh | |
| 2005/0174340 A1 * | 8/2005 | Jones | 345/204 |
| 2005/0238228 A1 | 10/2005 | Platt | |
| 2006/0082710 A1 * | 4/2006 | Kitson | 349/139 |
| 2008/0018577 A1 * | 1/2008 | Fricke et al. | 345/88 |

FOREIGN PATENT DOCUMENTS

| | | |
|---|---|---|
| TW | 200721106 A | 6/2007 |
| WO | 03/103013 | 12/2003 |
| WO | 2005059875 | 6/2005 |

* cited by examiner

DISPLAY ELEMENT HAVING GROUPS OF INDIVIDUALLY TURNED-ON STEPS

CROSS-REFERENCE TO RELATED APPLICATION

This application is a U.S. National Stage Application of International Patent Application No. PCT/US2007/073899, filed on Jul. 19, 2007, which claims priority to U.S. Non-Provisional patent application Ser. No. 11/492,163, filed on July. 23, 2006, each entitled "DISPLAY ELEMENT HAVING GROUPS OF INDIVIDUALLY TURNED-ON STEPS".

BACKGROUND

The most common type of display device requires the individual display elements of the display device to be refreshed a number of times per second to maintain the picture being displayed. If power is removed from the display device, then no picture can be displayed on the display device. Another type of display device is one that only requires that power be provided to the display device when the picture displayed on the device is modified or changed. Otherwise, a static image remains displayed on the display device substantially indefinitely even in the absence of power to the display device, although power may still be needed for backlighting purposes.

The latter type of display device includes those implemented using bi-stable display elements. Bi-stable display elements have an on state, in which the display element is on and displaying image data, and an off state, in which the display element is off and not displaying image data. Because such bi-stable display elements have just two states, a number of independently addressable elements may be needed to implement a single pixel of a display device. For instance, to implement a single color of a pixel having three bits, or eight levels, of color depth, three such bi-stable display elements may be needed, since $2^{3\ bits}$ equals eight levels.

To realize a display device using such bi-stable display elements in which each pixel includes three colors, red, green, and blue, and each sub-pixel has eight, sixteen, or more tonal levels, a large number of bi-stable display elements may be needed. This in turn means that a large number of addressable lines have to be connected to the display elements, since each display element is independently addressable. The resulting display device, however, may be difficult to cost effectively manufacture, owing to the large number of bi-stable display elements and the large number of addressable lines connected to these elements.

DETAILED DESCRIPTION OF THE DRAWINGS

Figure 1A:
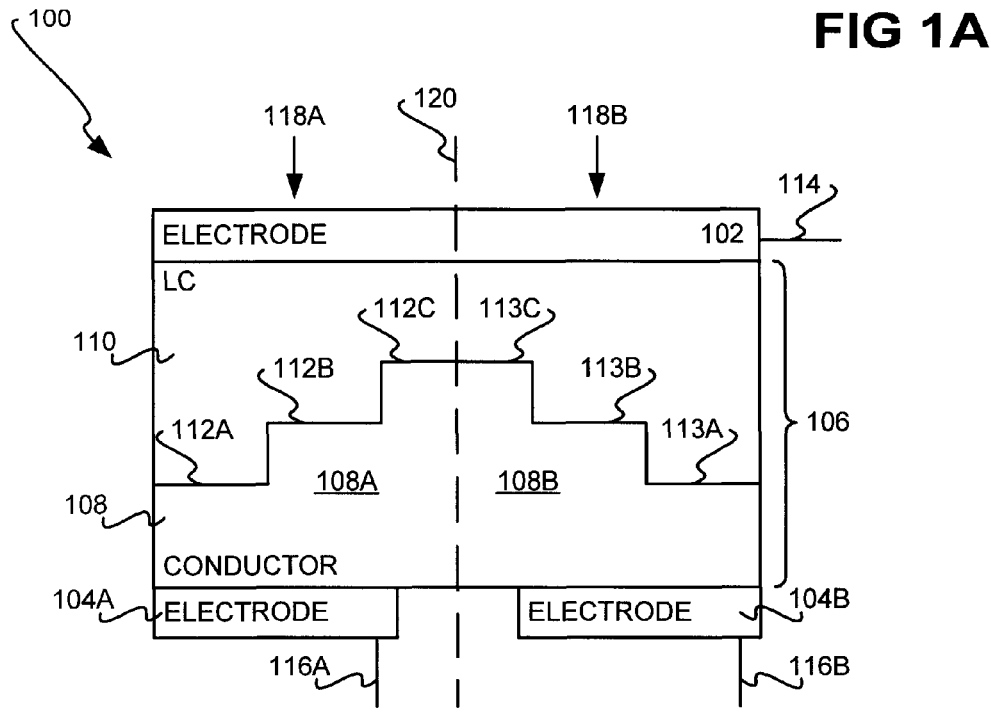
FIGS. 1A and 1B are diagrams of a front view and a cross-sectional top view, respectively, of a display element having a number of independently turned-on steps, according to an embodiment of the invention.
Figure 1B:
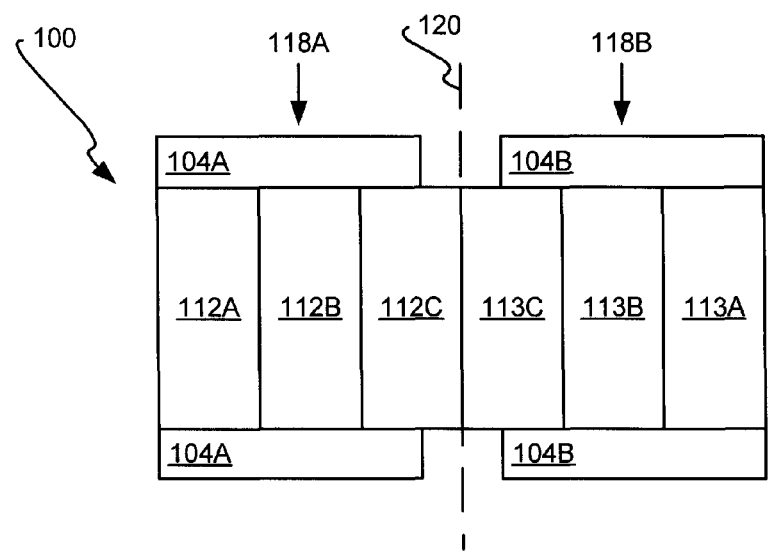

FIGS. 1A and 1B show a front view and a cross-sectional top view, respectively, of a display element 100 corresponding to a pixel of a display, according to an embodiment of the invention. The display element 100 includes a top electrode 102 and two bottom electrodes 104A and 104B, collectively referred to as the bottom electrodes 104. The top electrode 102 is connected to a first addressable line 114 of the display, and the bottom electrodes 104 are correspondingly connected to second addressable lines 116A and 116B of the display, collectively referred to as the second addressable lines 116.

Between the electrodes 102 and 104 is a display mechanism 106. In the embodiment of FIGS. 1A and 1B, the display mechanism 106 includes a conductive layer 108 and a liquid crystal layer 110. The conductive layer 108 may be polyethylenedioxythiophene (PEDOT), or another type of conductive layer. The conductive layer 108 is patterned such that the conductive layer 108A is connected to the electrode 104A and the conductive layer 108B is connected to the electrode 104B. The liquid crystal layer 110 may be a post aligned bi-stable nematic (PABN) liquid crystal layer, or another type of liquid crystal layer. The display element 100 is bi-stable, in that once it has been turned on by applying a first voltage between the electrodes 102 and 104A and/or a second voltage between the electrodes 102 and 104B, the element 100 remains in its current state, until it is turned off. That is, voltages do not have to be continually applied between the electrodes 102 and 104A and the electrodes 102 and 104B for the element 100 to remain in its current state, once the element 100 has been switched to that state. Stated another way and most generally, the display element 100 remains in its current state until one or more voltages are applied to change the state of the display element 100.

The display mechanism 106 has a number of individually turned-on steps 112A, 112B, and 112C, collectively referred to as the individually turned-on steps 112, and a number of individually turned-on steps 113A, 113B, and 113C, collectively referred to as the individually turned-on steps 113. The steps 112 and 113 are organized into two groups of steps: a first group corresponding to the steps 112, and a second group corresponding to the steps 113. While there are three such steps 112 and three such steps 113 in the example of FIGS. 1A and 1B, in other embodiments there may be more or less of the steps 112 and of the steps 113. Furthermore, while there are two groups of steps in the example of FIGS. 1A and 1B, in other embodiments there may be more than two groups.

The group of steps 112 corresponds to the bottom electrode 104A, and to a first sub-display element 118A to the left of the dotted line 120. The group of steps 113 corresponds to the bottom electrode 104B, and to a second sub-display element 118B to the right of the dotted line 120. The number of groups of steps corresponds to the number of the bottom electrodes 104. The top electrode 102 is shared by all the groups of steps. While there are two sub-display elements 118A and 118B depicted in the example of FIGS. 1A and 1B, in other embodiments there may be more than two sub-display elements.

The steps 112 and 113 can further correspond to different pillars or other types of structures within the display mechanism 106. That is, the terminology step as used herein is used in a broad, encompassing sense. As such, this terminology encompasses different types of structures that can be implemented within the display mechanism 106, such as pillars.

The steps 112 and 113 are individually turned on in that each of the steps 112 and 113 may be turned on, and display image data, while the other of the steps 112 and 113 remain off. In one embodiment, when a given step is turned on, it displays image data, and when a given step is turned off, it does not display image data. (Alternatively, when a given step is turned on, it does not display image data, and when it is turned off, it does display image data.) As depicted in FIG. 1B in particular, each of the steps 112 and 113 corresponds to a different area of the display mechanism 106.

The individually turned-on steps 112 and 113 are defined by varying the heights of the layers 108 and 110, from top to bottom in FIG. 1A, along the width of the display element 100, from left to right in both FIGS. 1A and 1B. The steps 112 and 113 may have the same or different widths from left to right in FIGS. 1A and 1B. The smaller the gap between a given step of the conductive steps 112 and 113 and the opposing electrode 102, the lower the required voltage to turn on that step.

Thus, the steps 112A, 112B, and 112C have positive turn-on voltage thresholds PV1A, PV1B, and PV1C, respectively, where PV1A>PV1B>PV1C. Therefore, a given applied positive voltage PV1 between the electrodes 102 and 104A turns on all the steps 112 having positive turn-on voltage thresholds equal to or less than the positive voltage PV1. Likewise, the steps 113A, 113B, and 113C have positive turn-on voltage thresholds PV2A, PV2B, and PV2C, respectively, where PV2A>PV2B>PV2C. A given applied positive voltage PV2 between the electrodes 102 and 104B turns on all the steps 113 having positive turn-on voltage thresholds equal to or less than the positive voltage PV2.

Furthermore, the larger the gap between a given step of the conductive steps 112 and 113 and the opposing electrode 102 in FIG. 1A, the greater the magnitude of the negative voltage that is needed to be applied to turn off that step. Thus, the steps 112A, 112B, and 112C have negative turn-off voltage thresholds NV1A, NV1B, and NV1C, respectively, where $|NV1A|>|NV1B|>|NV1C|$, where $|x|$ is the absolute value of x. If the (negative) signage of the voltage thresholds are taken into account, then NV1A<NV1B<NV1C. Therefore, a given applied negative voltage NV1 between the electrodes 102 and 104A turns off all the steps having negative turn-off voltage thresholds having absolute magnitudes equal to or less than the absolute magnitude of the negative voltage NV1.

Likewise, the steps 113A, 113B, and 113C have negative turn-off voltage thresholds NV2A, NV2B, and NV2C, respectively, where $|NV2A|>|NV2B|>|NV2C|$, where $|x|$ is the absolute value of x. If the (negative) signage of the voltage thresholds are taken into account, then NV2A<NV2B<NV2C. A given applied negative voltage NV2 between the electrodes 102 and 104B turns off all the steps having negative turn-off voltage thresholds having absolute magnitudes equal to or less than the absolute magnitude of the negative voltage NV2.

In general, the steps 112 and 113 are turned on in a desired combination. For each sub-display element, a positive voltage is applied that is equal to or greater than the step of this sub-display element having the highest positive turn-on voltage threshold that is to be turned on. This positive voltage turns on all the steps of this sub-display element having positive turn-on voltage thresholds less than the positive voltage applied. Next, a negative voltage is applied that is equal to or less than the step of the sub-display element having the lowest, most negative turn-off voltage threshold that has been turned on but should be turned off. That is, a negative voltage is applied that has an absolute magnitude that is greater than or equal to the step of the sub-display element having a turn-off voltage threshold that has the highest absolute magnitude and that has been turned on but should be turned off. This negative voltage turns off all the steps of the sub-display element having negative turn-off voltage thresholds having absolute magnitudes less than the absolute magnitude of the negative voltage applied.

This process is then repeated for the step having the next-highest positive turn-on voltage threshold that is to be turned on, the next-lowest negative turn-off voltage threshold (i.e., the negative turn-off voltage having the next-highest absolute magnitude) that is to be turned off, and so on, until the steps of the sub-display element have been turned on in the desired combination. The process is then repeated for each other sub-display element, so that the desired step or steps of each other sub-display element are turned on. Therefore, in the example of FIGS. 1A and 1B, the process can be first performed for the sub-display element 118A, and then performed for the sub-display element 118B, or vice-versa.

For example, consider the situation where the steps 112A and 112C of the sub-display element 118A are to be turned on, and the step 112B of the sub-display element 118A and all the steps 113 of the sub-display element 118B are to remain off. A positive voltage is applied between the electrodes 102 and 104A that is equal to or greater than PV1A, the positive turn-on voltage threshold for the step 112A. This turns on all the steps 112. Next, a negative voltage is applied between the electrodes 102 and 104A that is equal to or less than NV1B, the negative turn-off voltage threshold for the step 112B, but greater than NV1A, the negative turn-off voltage threshold for the step 112A. (That is, the negative voltage has an absolute magnitude that is equal to or greater than the absolute magnitude of NV1B, but that is less than the absolute magnitude of NV1A.) This turns off the steps 112B and 112C, while the step 112A remains on.

However, the step 112C is also to be turned on. Therefore, another positive voltage between the electrodes 102 and 104A is applied, which is equal to or greater than PV1C, the positive turn-on voltage threshold for the step 112C, but is less than PV1B, the positive turn-on voltage threshold for the step 112B. This turns on the step 112C. Because none of the steps 113 of the sub-display element 118B have to be turned on, no voltages need to be applied between the electrodes 102 and 104B.

There are advantages of having a display element 100 having individually turned-on steps 112 and 113 organized into groups of steps corresponding to the number of electrodes 104 and thus defining multiple sub-display elements 118. As compared to having a display element having individually turned-on steps in which there is just one electrode 104 and thus not defining multiple sub-display elements, embodiments of the invention provide for improved manufacturability, yield, and design margin. These advantages are now described in detail.

For example, consider the case where the display element 100 has six steps 112 and 113, as in the embodiment of FIGS. 1A and 1B. In the embodiment of FIGS. 1A and 1B, where these steps are divided over two sub-display elements, a greater margin is allowed in the turn-on and turn-off voltage threshold differences among the steps 112, and in the voltage threshold differences among the steps 113. The voltage thresholds of the steps 112 are independent of the voltage threshold of the steps 113, and indeed, the voltage thresholds for the steps 112 can correspondingly equate to those for the steps 113. Thus, there is greater separation among the voltage thresholds for the steps 112 and among the voltage thresholds for the steps 113, since for a given range of allowable voltage thresholds, just three different voltage thresholds have to be selected in the example of FIGS. 1A and 1B for each group of steps 112 and 113.

If a display element were to have six steps that were not divided over two sub-display elements, a lesser margin would be afforded in the turn-on and turn-off voltage threshold differences among the steps. For the same given range of allowable voltage thresholds, six different voltage thresholds would have to be selected for the six steps. Therefore, higher precision would be needed in manufacturing the display element, which can result in reduced yield and lesser design margin. By comparison, dividing the six steps into two groups of three steps each means that less precision would be needed in manufacturing the display element, which can result in increased yield due to greater design margin. Other design advantages include enabling large display sizes or integration of addressing electronics.

For example, the range of allowable voltage thresholds may be from V1 to V2, where V2 minus V1 is equal to Vrange. As such, if a display element were to have six steps that were not divided over two or more sub-display elements, and assuming the simple case where the voltage thresholds for the steps are equidistant from one another, then the voltage threshold of each step would be separated by a voltage of Vrange divided by five from the voltage thresholds of the adjacent steps. By comparison, the display element 100 of FIGS. 1A and 1B, where the six steps are divided over two sub-display elements, then the voltage threshold of each step of each group is separated by a voltage of Vrange divided by two from the voltage thresholds of the adjacent steps in that group.

Therefore, in this example, dividing the six steps of a display element into two groups and two sub-display elements increases the spacing between voltage thresholds of adjacent steps by $$\frac{\frac{Vrange}{2} - \frac{Vrange}{5}}{\frac{Vrange}{5}}.$$

The spacing between voltage thresholds of adjacent steps is thus increased by 150%. Increasing the spacing between voltage thresholds of adjacent steps means that less precision is needed in manufacturing the steps of the display element as well as the associated drive electronics used to address the display element, thus resulting in increased yield.

The manner by which the individually turned-on steps of the groups of the display element are realized is not limited by embodiments of the invention. For instance, FIGS. 1A and 1B show an example in which the display element 100 has a left side and a right side. The groups of the steps 112 and 113, as well as the bottom electrodes 104, are organized contiguously from the left side to the right side of the display element 100. Thus, all of the steps 112 of one group, and the electrode 104A, are to the left of the dotted line 120, whereas all of the steps 113 of another group, and the electrode 104B, are to the right of the dotted line 120.

Figure 2:
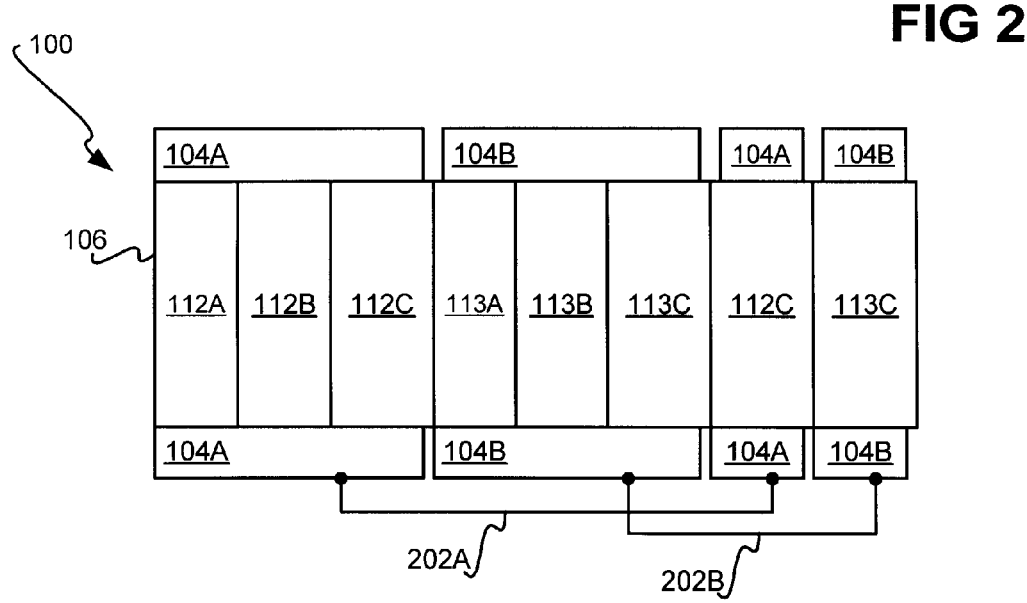
FIGS. 2, 3, 4, and 5 are diagrams of a cross-sectional top view of a display element, according to different embodiments of the invention.

FIG. 2 shows a top view of the display element 100 in which the groups of steps 112 and 113 and the electrodes 104 are non-contiguously organized from the left side to the right side of the display element 100, according to a different embodiment of the invention. In particular, the steps 112C and 113C are divided, as are the electrodes 104A and 104B. Thus, from left to right, the complete steps 112A and 112B of the group of steps 112 are situated, followed by a first part of the step 112C of this same group of steps. Thereafter, the complete steps 113A and 113B of the group of steps 113 are situated, followed by the second part of the step 112C of the group of steps 112. Finally, the second part of the step 113C of the group of steps 113 is situated.

Even though the electrodes 104 are divided, the parts of the electrode 104A are electrically connected to one another, which is diagrammatically illustrated in FIG. 2 as a wire 202A for illustrative convenience, and the parts of the electrode 104B are electrically connected to one another, which is diagrammatically illustrated in FIG. 2 as a wire 202B for illustrative convenience. Organizing the groups of steps 112 and 113 non-contiguously from the left side to the right side of the display element 100 can be advantageous. In particular, it ensures that there are not large lit or non-lit regions of the display element 100, reducing the likelihood of generating observable patterns in the displayed image. For instance, where just the step 112C is lit, having the step 112C divided into two non-contiguous parts ensures that no large non-lit region of the display element 100 exists.

The groups of steps 112 and 113 can be arranged non-contiguous from the left side to the right side of the display element 100 in other ways than is shown in FIG. 2. In FIG. 2, non-contiguous arrangement or organization is achieved by splitting one step of each group, namely the steps 112C and 113C, in non-contiguous fashion. Alternatively, however, as one example, none of the steps 112 and 113 may be divided or split. For instance, the steps 112 and 113 may be organized from left to right as follows: complete steps 112A, 112B, 113A, 112C, 113B, and 113C. In this example, steps 112A and 112B are non-contiguous with the step 112C of the same group of steps 112, and steps 113B and 113C are non-contiguous with the step 113A of the same group of steps 113.

The examples of FIGS. 1A, 1B, and 2 have the groups of the steps 112 and 113 organized such that each step extends completely from the top side to the bottom side of the display element 100. For example, in FIG. 2, all of the steps 112 and 113 extend completely from the top to the bottom of the display element 100, even though the steps 112C and 113C are divided from the left side to the right side of the display element 100. However, other embodiments of the invention are not so limited.

Figure 3:
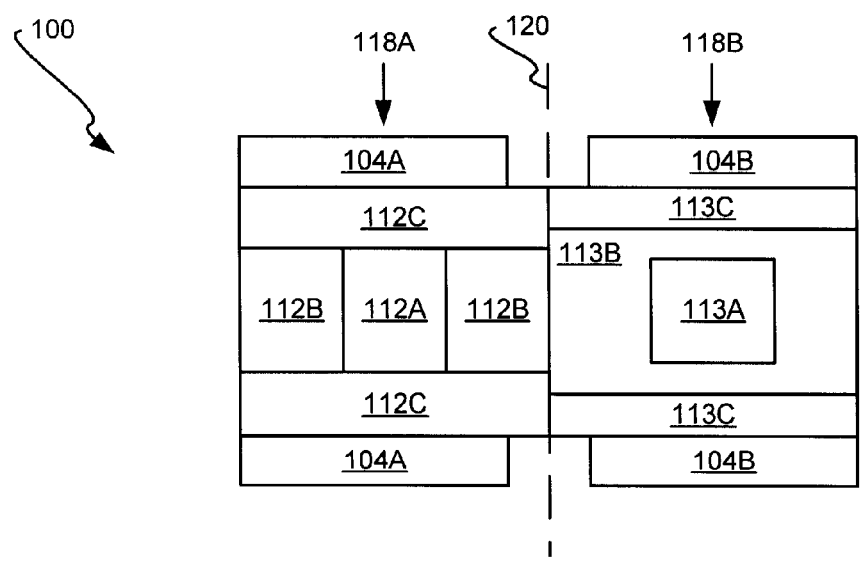

FIG. 3 shows a top view of the display element 100 in which none of the steps 112 and 113 extend completely from the top side to the bottom side of the display element 100, according to a different embodiment of the invention. Of the group of steps 112, the step 112A is located within the interior of the sub-display element 118A to the left of the dotted line 120. The step 112B is divided into two parts, each of which has a top side flush with the top side of the step 112A and a bottom side flush with the bottom side of the step 112A. The step 112C is also divided into two parts, each of which extend from the left side of the sub-display element 118A to the right side of the sub-display element 118A.

Of the group of steps 113, the step 113A is located within the interior of the sub-display element 118B to the right of the dotted line 120. The step 113B surrounds the step 113A, and indeed shares a common center with the step 113A. The step 113C is divided into two parts, of which extend from the left side of the sub-display element 118B to the right side of the sub-display element 118B. Neither of the electrodes 104 is divided in the example of FIG. 3.

It is noted that the steps 112A, 12B, and 112C can each further be sub-divided into many non-contiguous areas distributed throughout the entire area occupied by the steps 112A, 112B, and 112C, to further distribute lit and non-lit areas. In addition, the ratio of the area of each of the steps 112A, 112B, and 112C to the total area occupied by all the steps 112A, 112B, and 112C may be unequal to optimally match the lightness response of the human visual system.

The examples of FIGS. 1A, 1B, 2, and 3 substantially have the groups of the steps 112 and 113 having equally sized areas, such that the electrodes 104 substantially have equally sized areas. For example, in FIG. 3, the area occupied by the group of steps 112 is substantially equal to the area occupied by the group of steps 113. As such, the area occupied by the electrode 104A is substantially equally to the area occupied by the electrode 104B. However, other embodiments are not so limited.

Figure 4:
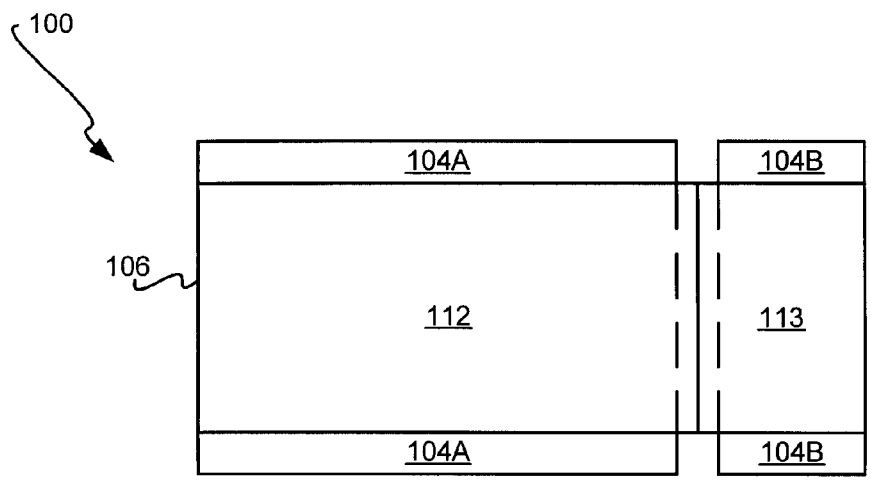

FIG. 4 shows a top view of the display element 100 in which the groups of steps 112 and 113 have unequal areas and the electrodes 104 have unequal areas, according to a different embodiment of the invention. As depicted in FIG. 4, the group of steps 112, of which the individual steps 112A, 112B, and 112C are not particularly shown, has a larger area than the group of steps 113, of which the individual steps 113A, 113B, and 113C are not particularly shown, does. Likewise, the electrode 104A has a larger area than the electrode 104B does.

The examples of FIGS. 1A, 1B, 2, 3, and 4 substantially have the groups of the steps 112 and 113 having a rectangular shape from the top view, such that the electrodes 104 likewise have a rectangular shape from the top view. For example, in FIG. 4, the shape of the group of steps 112 is rectangular, and the corresponding electrode 104A is rectangular. Likewise, the shape of the group of steps 113 is rectangular, and the corresponding electrode 104B is rectangular. However, other embodiments are not so limited.

Figure 5:
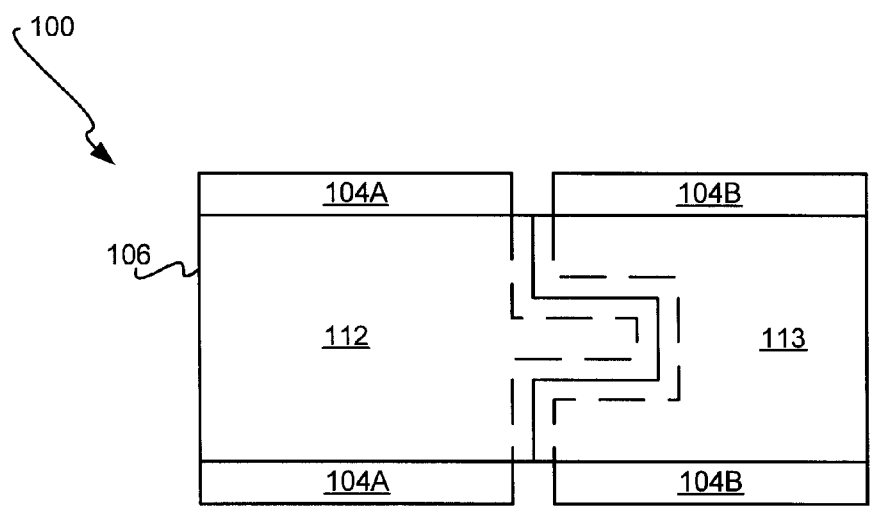

FIG. 5 shows a top view of the display element 100 in which the groups of steps 112 and 113 have non-rectangular shapes and the electrodes 104 likewise have non-rectangular shapes, according to a different embodiment of the invention. As depicted in FIG. 5, the groups of steps 112 and 113 both have non-rectangular shapes. The electrodes 104 likewise correspondingly have non-rectangular shapes that effectively mirror the shapes of their corresponding groups of steps 112 and 113.

In one embodiment, each of the individually turned-on steps of all the groups of steps of a display element corresponds to a single color of a pixel of a display. For instance, the steps of all the groups of the display element may correspond to the color red of the pixel, the color green of the pixel, or the color blue of the pixel. As such, the steps provide for multiple tone levels of the display element for this color of the pixel. For example, where there are N steps, the steps provide for $2^N$ tonal levels for the color of the pixel to which the display element corresponds. That is, the display element can realize a desired grayscale value in question by, for each group of the individually turned-on steps, applying an appropriate voltage between the top electrode and the bottom electrode to which the group of steps corresponds.

In another embodiment, the individually turned-on steps of a display element may be divided into groups, where each group is connected to its own bottom electrode and corresponds to a different color of a pixel of a display to which the display element itself corresponds. For instance, the steps of the display element may be grouped into three groups: a red group corresponding to the color red of the pixel and connected to a first bottom electrode, a green group corresponding to the color green of the pixel and connected to a second bottom electrode, and a blue group corresponding to the color blue of the pixel and connected to a third bottom electrode. In this way, the steps provide for multiple levels of contrast depth of the display element for each of the three colors of the pixel. For example, where there are R steps in the red group, G steps in the green group, and B steps in the blue group, the steps provide for $2^R$ levels of contrast depth for red, $2^G$ levels of contrast depth for green, and $2^B$ levels of contrast depth for blue of the pixel to which the display element corresponds.

Figure 6:
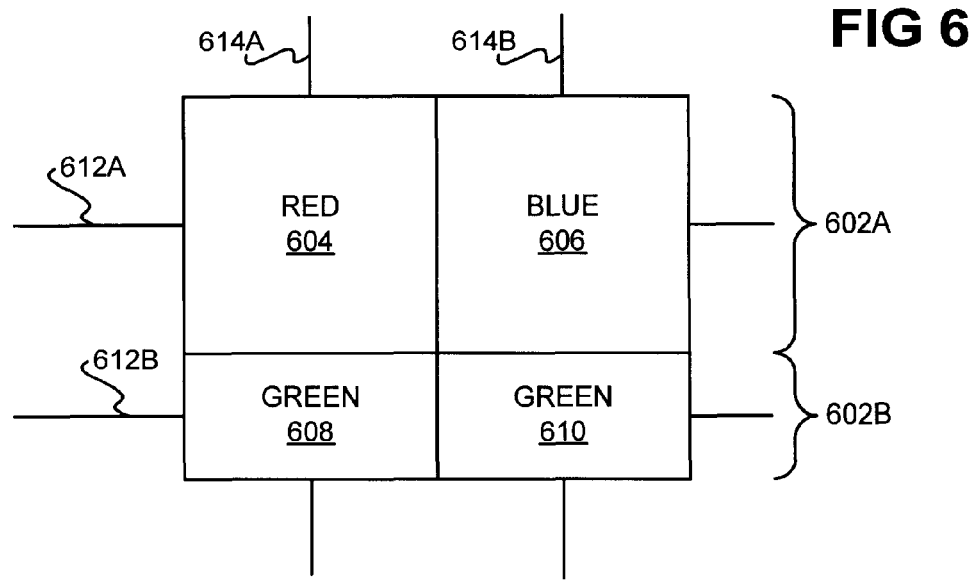
FIG. 6 is a diagram of a cross-sectional top view of a number of display elements, according to an embodiment of the invention.

FIG. 6 shows a top view of two display elements 602A and 602B, according to an embodiment of the invention. The display elements 602A and 602B are collectively referred to as the display elements 602. The display element 602A is connected to the first addressable line 612A, whereas the display element 602B is connected to the first addressable line 612B. Both of the display elements 602 are connected to both second addressable lines 614A and 614B.

The display element 602A has a red group of steps 604 and a blue group of steps 606, where the former group 604 is connected to the second addressable line 614A and the latter group of steps 606 is connected to the second addressable line 614B. Both groups of steps 604 and 606 of the display element 602A are connected to the first addressable line 612A. The electrodes of the display element 602A are not shown. The red group of steps 604 corresponds to a first sub-display element of the display element 602A, and the blue group of steps 606 corresponds to a second sub-display element of the display element 602A. Therefore, by appropriately applying a voltage between the lines 612A and 614A, and by appropriately applying a voltage between the lines 612A and 614B, different grayscale values of each of red and blue can be displayed by the display element 602A, by turning on a different number of the red steps 604 and a different number of the blue steps 606.

The display element 602B has two green groups of steps 608 and 610. The group of steps 608 is connected to the second addressable line 614A and the group of steps 610 is connected to the second addressable line 614B, where both groups of steps 608 and 610 are connected to the first addressable line 612B. The electrodes of the display element 602B are not shown. The group of steps 608 corresponds to a first sub-display element of the display element 602B, whereas the group of steps 610 corresponds to a second sub-display element of the display element 602B. By appropriately applying a voltage between the lines 612B and 614A, and by appropriately applying a voltage between the lines 612B and 614B, different grayscale values of green can be displayed by the display element 602B, by turning on different of the steps 604 and 606.

For example, where each of the groups of steps 604, 606, 608, and 610 has three steps, there can be at most $2^3$, or eight, shades of red, $2^3$, or eight, shades of blue, and $2^6$, or 64 shades of green. A display element is thus defined in the example of FIG. 6 as having a number of different groups of steps, where each group is connected to a different second addressable line as compared to the other groups of steps of this display element. A display element is also defined in the example of FIG. 6 as connected to one and only one first addressable line, which is connected to all the groups of steps of the display element. Each of the display elements 602 of FIG. 6 may correspond to the same pixel of a display, where the display element 602A is responsible for displaying the red and blue color components of the pixel, and the display element 602B is responsible for displaying the green color component of the pixel. An advantage of this approach is a reduction in the number of addressing lines needed.

Figure 7:
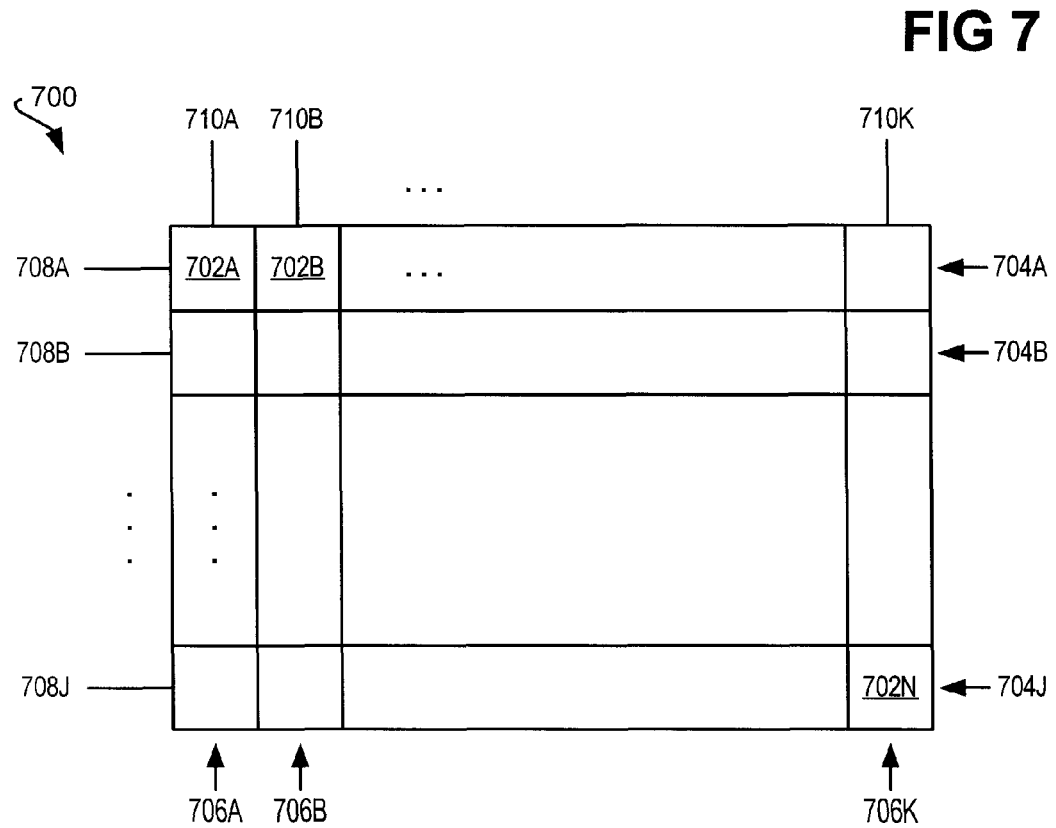
FIG. 7 is a diagram of a display device, according to an embodiment of the invention.

FIG. 7 shows a representative display device 700, according to an embodiment of the invention. The display device 700 includes a number of display elements 702A, 702B, . . . , 702N, collectively referred to as the display elements 702, and which correspond to the pixels of the display device 700. Each display element may correspond to a different pixel, or groups of two or more display elements may correspond to the same pixel, as in the example of FIG. 6 that has been described. The display elements 702 are organized in rows 704A, 704B, . . . , 704J, collectively referred to as the rows 704, and columns 706A, 706B, . . . , 706K, collectively referred to as the columns 706.

Each of the display elements 702 can be implemented as the display element 100 as has been described. The display elements 702 can be bi-stable display elements, such that they retain their current states being displayed even if power is removed from the elements 702. Thus, power is needed only to change the states of the display elements 702, and not to retain the states of the display element 702.

The display device 700 also includes first addressable lines 708A, 708B, . . . , 708J, collectively referred to as the addressable lines 708 and corresponding to the rows 704 into which the display elements 702 are organized. The display device 700 further includes second addressable line groups 710A, 710B, . . . , 710K, collectively referred to as the second addressable line groups 710 and corresponding to the columns 706 into which the display elements 702 are organized. Each second addressable line group includes at least two second addressable lines. Thus, each display element of the display device 700 is connected to a first addressable line, and at least two second addressable lines. The display device 700 can and typically will include other components, in addition to the display elements 702, the addressable lines 708 and the addressable line groups 710, as can be appreciated by those of ordinary skill within the art.

The first addressable lines 708 are connected to all of the display elements 702 within their respective rows 704. Thus, the first addressable line 708A is connected to all of the display elements 702 within the row 704A, the first addressable line 708B is connected to all of the display elements 702 within the row 704B, and so on. Similarly, the second addressable line groups 710 are connected to all of the display elements within their respective columns 706. Thus, the second addressable lines of the second addressable line group 710A are connected to all of the display elements 702 within the column 706A, the second addressable lines of the second addressable line group 710B are connected to all of the display elements 702 within the column 706B, and so on.

In this way, each of the display elements 702 is addressable by a unique pair of a first addressable line and a second addressable line group, including one of the addressable lines 708 and all the second addressable lines of one of the second addressable line groups 710. That is, no two display elements are connected to both the same one of the addressable lines 708 and the same one of the addressable line groups 710. To change the state of a given display element, positive and/or negative voltages are applied between the first addressable line and at least one of the second addressable lines to which the display element in question is connected. This process is performed for each of the display elements 702, to change the states of all of the display elements 702.

In one embodiment, all the display elements 702 are instances of the same display element. For instance, all of the display elements 702 may be instances of the same display element 100, as in FIG. 4, where the left side of each display element is occupied by a first group of steps 112 that is larger in area than the right side of the display element as occupied by a second group of steps 113. However, other embodiments of the invention are not so limited.

Figure 8:
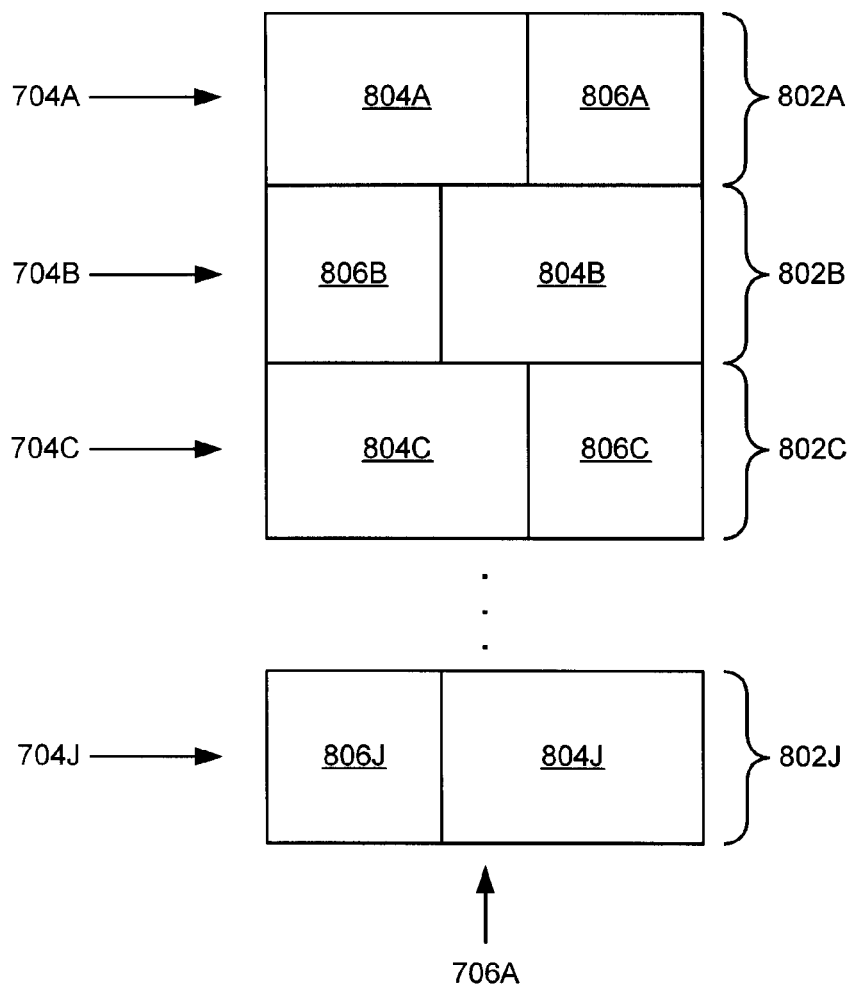
FIG. 8 is a diagram of a column of display elements of a display device, according to an embodiment of the invention.

FIG. 8 shows the column 706A of the display device 700 of FIG. 7 in more detail, according to a particular embodiment of the invention. Those of the display elements 702 of the display device 700 of FIG. 7 residing within the column 706A are referenced as display elements 802A, 802B, 802C, . . . , 802J, for descriptive convenience, and collectively referred to as the display elements 802. The display elements 802 reside in different instances of the rows 704 as shown. The display elements 802 correspondingly have first groups of steps 804A, 804B, 804C, . . . , 804J, collectively referred to as the first groups of steps 804, and second groups of steps 806A, 806B, 806C, . . . , 806J, collectively referred to as the second groups of steps 806. The first groups of steps 804 are larger in area than the second groups of steps 806.

In the embodiment of FIG. 8, not all the display elements 802 are instances of the exact same display element. Rather, the display elements 802 within the column 706A alternate by row as to being instances of two different display elements. The display elements 802 within odd-numbered rows, such as the display elements 802A and 802C, have their corresponding first groups of steps 804, such as the first groups of steps 804A and 804C, to the left side, and their corresponding second groups of steps 806, such as the second groups of steps 806A and 806C, to the right side. By comparison, the display elements 802 within even-numbered rows, such as the display element 802B, have their corresponding first groups of steps 804, such as the first group of steps 804B, to the right side, and their corresponding second groups of steps 806, such as the second group of steps 806B, to the left side.

Thus, within the example of FIG. 8, there are two types of display elements, where even-row display elements are of one type, and odd-row display elements are of another type. As such, corresponding groups of steps among the display elements 802 are not inline with one another. That is, all of the groups of steps 804 are not inline with one another, but rather alternate in position. Likewise, all of the groups of steps 806 are not inline with one another, but also rather alternate in position. This implementation can be advantageous, in that it ensures if a large number of display elements are all displaying the same color and/or grayscale value, imaging artifact patterns resulting from each display element being an instance of the same display element type may not be perceptible to the human eye.

Figure 9:
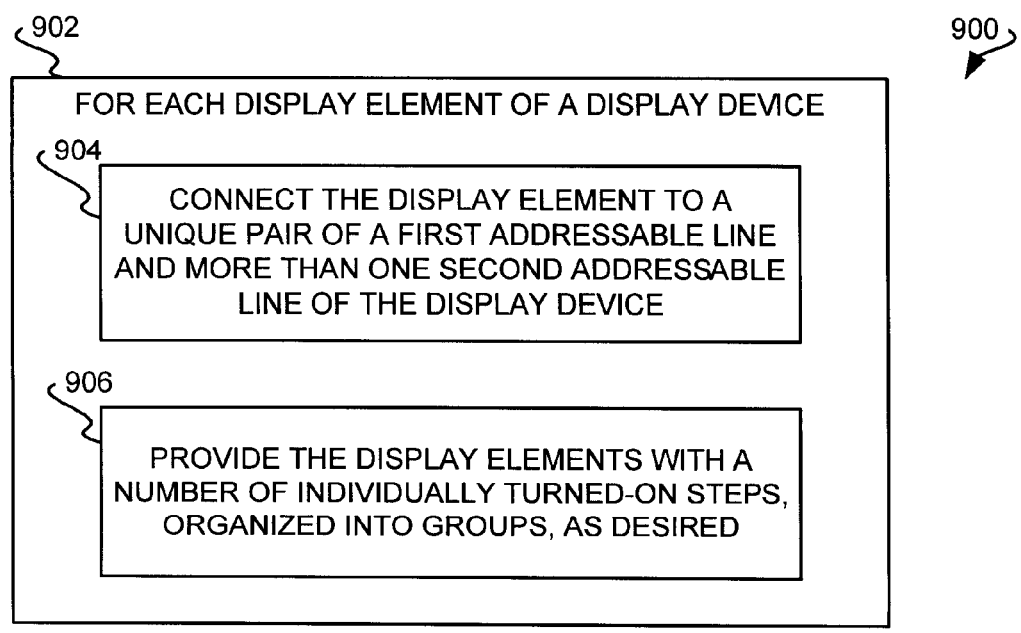
FIG. 9 is a flowchart of a method, according to an embodiment of the invention.

FIG. 9 shows a rudimentary method 900, according to an embodiment of the invention. As indicated by part 902 of the method 900, the method 900 is performed for each display element of a display device that corresponds to a pixel of the display device. First, the display element in question is connected to a unique pair of a first addressable line and more than one second addressable line of the display device (904), such as has been described in relation to FIG. 7. Second, the display element is provided with a number of individually turned-on steps as desired (906), as has been described above. That is, the steps are organized into a number of groups corresponding to the number of second addressable lines to which the display element is connected.

Embodiments of the invention thus provide for advantages over other approaches to achieve multiple-bit contrast depth display elements (i.e., display elements with multiple levels of contrast), particularly to achieve multiple-bit contrast depth bi-stable display elements. Within the prior art, a given bi-stable display element has just two states, on and off. As a result, to achieve multiple-bit contrast depth, a number of such display elements may need to be used to correspond to a given pixel or a given pixel color. However, where these display elements each is addressable by a unique pair of addressable lines of the display device, the resulting number of addressable lines needed can be quite large, resulting in a cost-prohibitive display device design.

By comparison, embodiments of the invention provide for a bi-stable display element that has more than two states.

Multiple-bit contrast depth can then be achieved by using a single display element. All of the states of such a display element are controlled by the same unique pair of a first addressable line and more than one second addressable line of the display device connected to this display element. As a result, as compared to the prior art, less addressable lines are needed to achieve the same multiple-bit contrast depth, which renders the resulting display device design more cost effective.

We claim:

1. A display element corresponding to a pixel of a display, comprising:
    a first electrode having a flat surface connected to a first addressable line of the display;
    a plurality of second electrodes, each second electrode connected to a corresponding second addressable line of the display, each second electrode having a flat surface;
    a liquid crystal layer situated between the first and the second electrodes, and having a plurality of individually turned-on steps organized into a number of groups corresponding to a number of the second electrodes;
    a conductor disposed between the second electrodes and the liquid crystal layer, the conductor having a flat surface in physical contact with the flat surface of the plurality of second electrodes
    wherein the individually turned-on steps are defined by varying the heights of the liquid crystal layer and the conductor along the width of the display element between the first electrode and the plurality of second electrodes to form a plurality of discrete conductive steps in physical contact with the liquid crystal layer,
    wherein, for each group of the individually turned-on steps, each individually turned-on step of the group has a turn-on voltage threshold at which the step is turned on upon a voltage applied between the first electrode and the second electrode to which the group corresponds equal to or greater than the turn-on voltage threshold,
    and wherein each group of the individually turned-on steps corresponds to a different color of the pixel, as one of red, green, and blue.

2. The display element of claim 1, wherein the display element is to realize a desired grayscale value by, for each group of the individually turned-on steps, applying a voltage between the first electrode and the second electrode to which the group corresponds.

3. The display element of claim 1, wherein, for each group of the individually turned-on steps, each individually turned-on step of the group has a turn-off voltage threshold at which the step is turned off upon a voltage applied between the first electrode and the second electrode to which the group corresponds equal to or less than the turn-off voltage threshold.

4. The display element of claim 1, wherein the display element has a left side and a right side, the groups of the individually turned-on steps and the second electrodes organized contiguously from the left side to the right side of the display element.

5. The display element of claim 1, wherein the display element has a left side and a right side, the groups of the individually turned-on steps and the second electrodes organized non-contiguously from the left side to the right side of the display element.

6. The display element of claim 1, wherein the display element has a front side and a back side, each individually turned-on step extending from the front side to the back side of the display element.

7. The display element of claim 1, wherein at least a sub-plurality of the individually turned-on steps are organized such that the individually turned-on steps of the sub-plurality have a common center.

8. The display element of claim 1, wherein at least one of the groups of the individually turned-on steps is unequal in area as compared to other of the groups of the individually turned-on steps, such that at least one of the second electrodes is unequal in area as compared to other of the second electrodes.

9. The display element of claim 1, wherein at least one of the second electrodes is non-rectangular in shape.

10. The display element of claim 1, wherein the liquid crystal layer comprises a post aligned bi-stable nematic (PABN) liquid crystal layer.

11. The display element of claim 1, wherein the display element is a bi-stable display element.

12. The display element of claim 1, wherein the groups of individually turned-on steps are contiguous to one another, and wherein the conductor electrically connects the groups to one another.

13. A display device comprising:
    a plurality of first addressable lines;
    a plurality of second addressable lines;
    a plurality of display elements corresponding to a plurality of pixels of the display device, each display element connected to one of the first addressable lines and a sub-plurality of the second addressable lines, such that no two of the display elements are connected to a same one of the first addressable lines and a same sub-plurality of the second addressable lines,
    wherein each display element has a plurality of individually turned-on steps organized into a number of groups corresponding to a number of the sub-plurality of the second addressable lines to which the display element is connected,
    wherein each display element comprises:
    a first electrode having a flat surface connected to the first addressable line of the display;
    a plurality of second electrodes, each second electrode connected to a corresponding second addressable line of the display, each second electrode having a flat surface;
    a liquid crystal layer situated between the first and the second electrodes, and having a plurality of individually turned-on steps organized into the number of groups;
    a conductor disposed between the second electrodes and the liquid crystal layer, the conductor having a flat surface in physical contact with the flat surface of the plurality of second electrodes;
    wherein the individually turned-on steps are defined by varying the heights of the liquid crystal layer and the conductor along the width of the display element between the first electrode and the plurality of second electrodes to form a plurality of discrete conductive steps in physical contact with the liquid crystal layer,
    wherein for each group of the individually turned-on steps of each display element, each individually turned-on step of the group has a turn-on voltage threshold at which the step is turned on upon a voltage applied between the first addressable line and the second addressable line to which the group corresponds equal to or greater than the turn-on voltage threshold,
    wherein each group of the individually turned-on steps corresponds to a different color of the pixel, as one of red, green, and blue, wherein for each display element, the groups of individually turned-on steps are physically contiguous to one another.

14. The display device of claim 13, wherein each display element is to realize a desired grayscale value for each group of the individually turned-on steps of the display element, by applying a voltage between the first addressable line and the second addressable line to which the group corresponds.

15. The display device of claim 13, wherein, for each group of the individually turned-on steps of each display element, each individually turned-on step of the group has a turn-off voltage threshold at which the step is turned off upon a voltage applied between the first addressable line and the second addressable line to which the group corresponds equal to or less than the turn-off voltage.

16. The display device of claim 13, wherein the display elements are organized in rows and columns, such that over the columns of the display elements, the groups of the individually turned-on steps of the display elements alternate such that corresponding groups among the display elements are not inline with one another.

\* \* \* \* \*